(12) United States Patent
Baliga et al.

(10) Patent No.: US 6,438,658 B1
(45) Date of Patent: Aug. 20, 2002

(54) FAST INVALIDATION SCHEME FOR CACHES

(75) Inventors: Harikrishna B. Baliga, Orangevale; Subramaniam Maiyuran; Salvador Palanca, both of Gold River, all of CA (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 09/609,072

(22) Filed: Jun. 30, 2000

(51) Int. Cl.$^7$ ............................................... G06F 12/00
(52) U.S. Cl. ........................ 711/141; 711/118; 711/143
(58) Field of Search .................................. 711/100, 118, 711/130, 133, 141, 143, 154, 167

(56) References Cited

U.S. PATENT DOCUMENTS

| | | | | |
|---|---|---|---|---|
| 5,155,824 A | * | 10/1992 | Edenfield et al. | 711/143 |
| 5,241,664 A | * | 8/1993 | Ohba et al. | 711/121 |
| 5,603,005 A | * | 2/1997 | Bauman et al. | 711/124 |
| 5,657,472 A | * | 8/1997 | Loo et al. | 711/158 |
| 5,664,149 A | * | 9/1997 | Martinez, Jr. et al. | 711/141 |
| 5,684,977 A | * | 11/1997 | Loo et al. | 711/143 |
| 5,737,756 A | * | 4/1998 | White et al. | 711/142 |
| 5,860,111 A | * | 1/1999 | Martinez, Jr. et al. | 711/143 |
| 5,905,998 A | * | 5/1999 | Ebrahim et al. | 711/144 |
| 6,038,645 A | * | 3/2000 | Nanda et al. | 711/141 |
| 6,266,743 B1 | * | 7/2001 | Carpenter et al. | 711/143 |
| 6,269,048 B1 | * | 7/2001 | Kano et al. | 365/233 |

* cited by examiner

Primary Examiner—Tuan V. Thai
(74) Attorney, Agent, or Firm—Blakely, Sokoloff, Taylor & Zafman LLP (57) ABSTRACT

A method and apparatus for single cycle, cache line invalidation within a cache memory is described. The method includes enabling memory cells within a cache state array of the cache memory. An invalid state is then written to each memory cell within the cache state array of the cache memory. The enabling of the memory cells within the cache state array of the cache memory occurs during a first phase of a clock cycle. While the writing of the invalid state to each memory cell within the cache state array of the cache memory occurs during a second phase of the clock cycle. Consequently, cache line invalidation of each cache line within the cache memory occurs within a single clock cycle formed by the first phase of the clock cycle and the second phase of the clock cycle. In partial invalidation of the cache memory is possible by way-subdividing the cache state array or set-subdividing the cache state array. One shot or single cycle cache line invalidation reduces the total time required for invalidation of all cache lines within the cache memory to just a clock cycle. The implementation is simple with minimal changes to the cache array limited only to those cells that store the state information of the cache lines. Since many system operations necessitate invalidation of the entire cache, one-shot invalidation clearly improves the system performance with no significant impact on the die size.

29 Claims, 10 Drawing Sheets

FAST INVALIDATION SCHEME FOR CACHES

FIELD OF THE INVENTION

The present invention relates generally to an integrated microprocessor system having a cache memory. In particular, the present invention relates to an apparatus and method for invalidation of all cache lines within the cache memory within a single clock cycle.

BACKGROUND OF THE INVENTION

Figure 1:
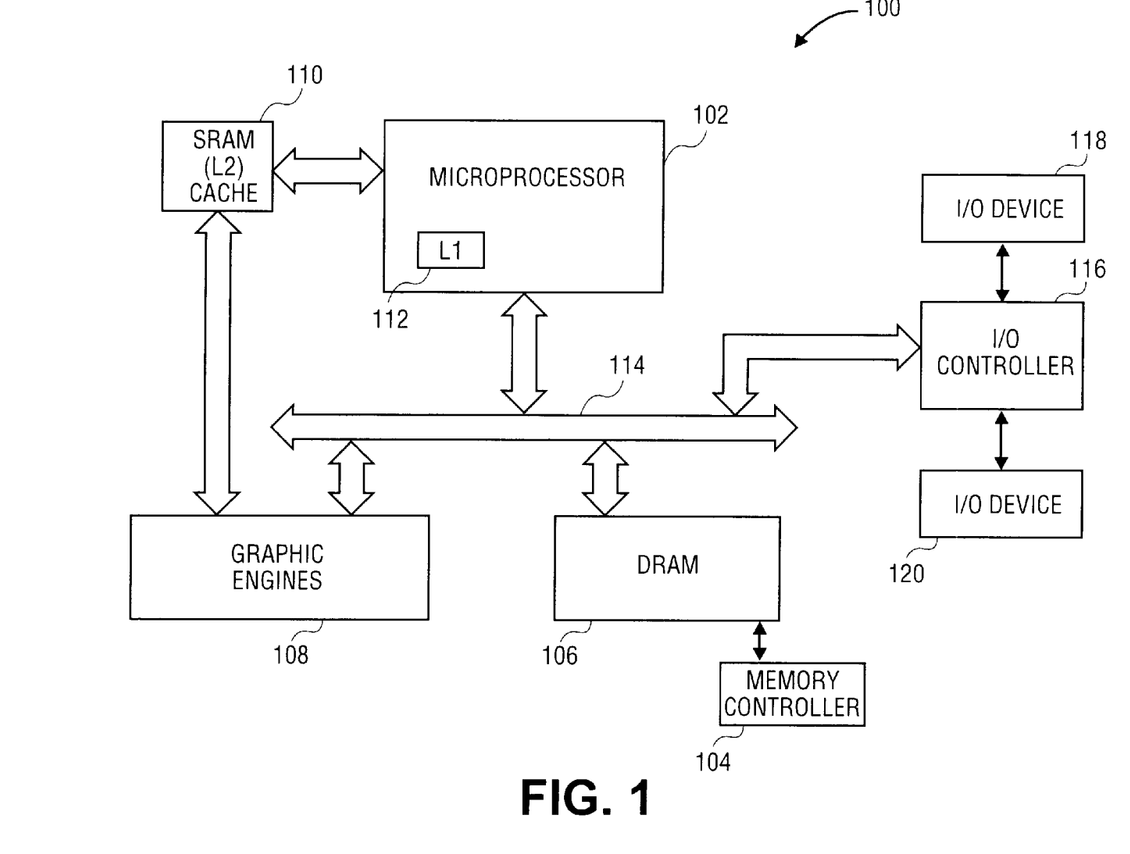
FIG. 1 depicts a block diagram of a shared cache memory multiprocessor system according to an embodiment of the present invention.

In an Integrated Microprocessor system, for example, as described in U.S. patent application Ser. No. 09/1031,318 entitled Cache Divided for Processor Core and Pixel Engine Uses filed Feb. 25, 1998 by Gary Peled et al ("cache sharing patent") now abandoned;, the level-two cache memory is shared between the CPU (Central Processing Unit) and the graphics engine. Referring to FIG. 1, an Integrated Microprocessor System 100 in accordance with the teaching of the cache sharing patent includes a CPU 102, a main memory controller 104 and a graphics engine 108, which are all integrated on a single die. The microprocessor 102, the graphics engine 108, the cache 110, and a DRAM (Dynamic Random Access Memory) main memory 106 are all coupled to a bus 114 in order to communicate information back and forth between the various components of the system 100. Also coupled to the bus 114 is an I/O controller 116 which, as shown in FIG. 1 supports two input/output devices 118 and 120. Conventionally, the cache 110, which is sometimes referred to as a level-two cache (L2 cache), and the cache 112, which is sometimes referred to as a level-one cache (L1 cache), may be used to store a small subset of the information resident in the DRAM 106 in order to speed up the operation of the system 100.

However, in accordance with the cache sharing patent, a shared cache array 110 in the Integrated Microprocessor System 100 is the cache farthest from the processor core, that is shared between the CPU requests and the graphics requests. The shared cache 110 can be in CPU only mode or in a dual CPU/Graphics mode. During CPU only mode, the entire cache is available for CPU access. While during dual CPU/Graphics mode, a predetermined portion of the shared cache 110 is available for the CPU and the remainder of the shared cache 110 is utilized for graphics requests. A process for switching from CPU only mode to the dual CPU/Graphics mode or vice versa is referred to as Context Switching. These concepts are used in the background and discussion of embodiments of the present invention, and apply to both.

Unfortunately, Context Switching can be a very time consuming process depending on the size of the shared cache 110. Conventionally, a context switch requires write back of all the modified cache lines to the main memory 106 and invalidation of all the cache lines in the shared cache 110. The same thing is true for a graphics request like FLUSH. For a graphics request like CLEAR, invalidation of all the lines in the shared cache 110 is required. CPU instructions WBINVD (Write Back Invalidate) writes back all the cache lines and then invalidates the entire cache 110 whereas the instruction INVD (Invalidate) just invalidates the entire cache 110.

Normally, writing back all the modified cache lines to the main memory and invalidating the entire cache 110 is done either with microcode routines or with dedicated hardware like Finite State Machines (FSM). Both of these methods use micro operations that take multiple CPU clock cycles per cache line. Unfortunately, the disadvantage with these methods is that invalidating each line takes a few clock cycles and invalidating the entire cache can take thousands of clock cycles or more depending on the cache size.

Therefore, there remains a need to overcome the limitations in the above described existing art, which is satisfied by the inventive structure and method described hereinafter.

BRIEF DESCRIPTION OF THE DRAWINGS

The features, aspects, and advantages of the present invention will become more fully apparent from the following Detailed Description and appended claims when taken in conjunction with accompanying drawings in which:

DETAILED DESCRIPTION OF THE INVENTION

The present invention overcomes the problems in the existing art described above by providing an apparatus and method for invalidation of all cache lines within the cache memory within a single clock cycle. In the following detailed description, numerous specific details are set forth in order to provide a thorough understanding of the present invention. However, one having ordinary skill in the art should recognize that the invention may be practiced without these specific details. For example, various signals, layout patterns, memory cell configurations and circuits, and logic circuits may be modified according to the teachings of the present invention. The following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In some instances, well-known structures, devices, and techniques have not been shown in detail to avoid obscuring the present invention.

Figure 2:
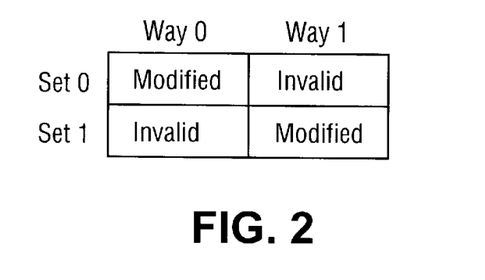
FIG. 2 depicts a two-way set associative cache having various cache states.
Figure 3A:
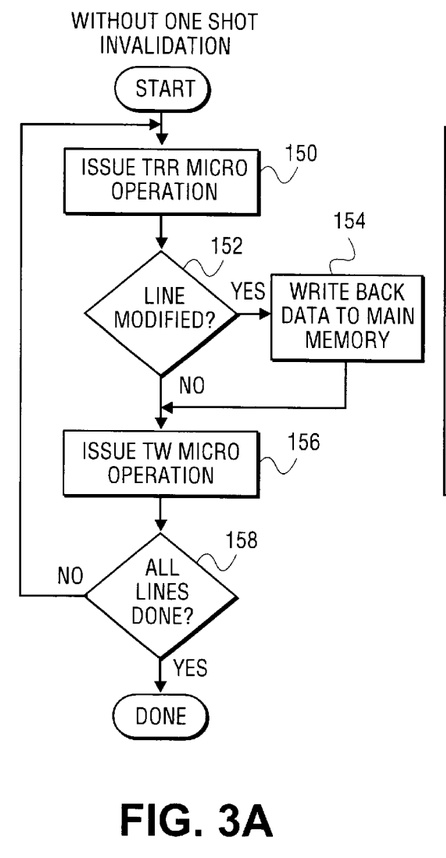
FIG. 3A depicts a conventional method with steps for cache line invalidation when performing a FLUSH routine.
Figure 3B:
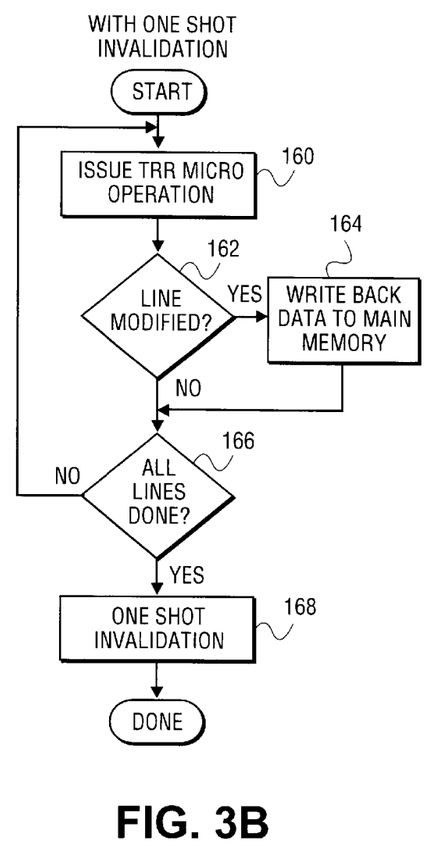
FIG. 3B depicts method with steps for single cycle cache line invalidation when performing a FLUSH routine according to an embodiment of the present invention.
Figure 4A:
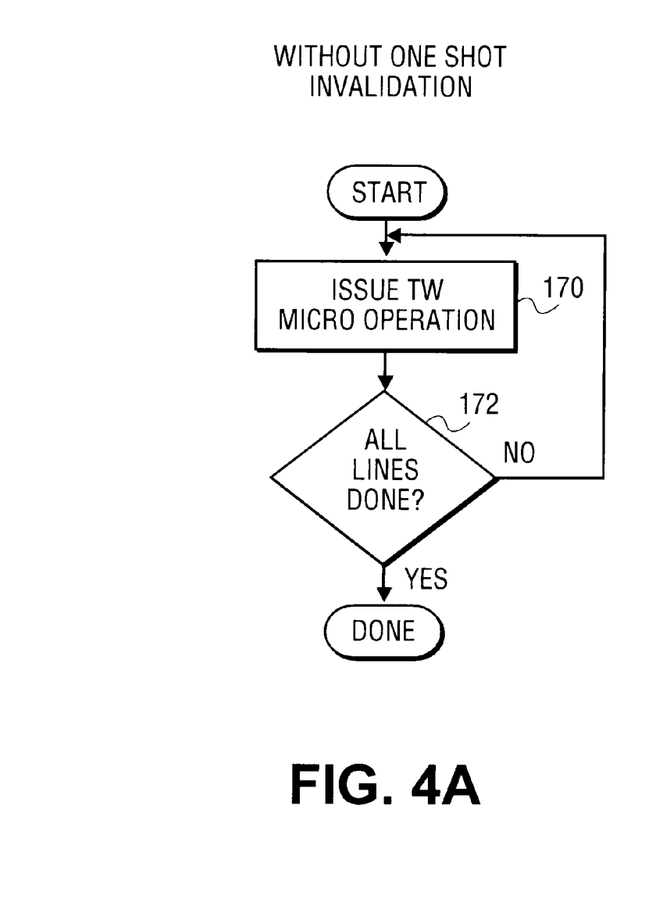
FIG. 4A depicts a conventional method with steps for cache line invalidation when performing a CLEAR routine/macro-instruction.
Figure 4B:
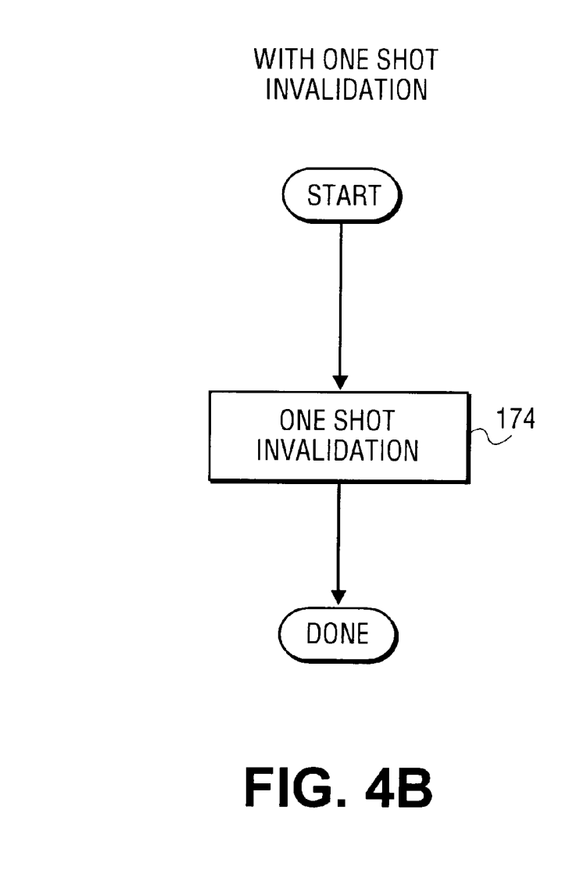
FIG. 4B depicts method with steps for single cycle cache line invalidation when performing a CLEAR routine/macro-instruction according to an embodiment of the present invention.

Consider a small cache as shown in FIG. 2. This cache is a two-way set associate cache with just two sets. A flush operation on this cache in response to a context switch or following a FLUSH graphics request or in response to a WBINVD CPU instruction would be as follows. For each cache line, a TRR (Tag Read and Data Read) micro operation is issued followed by a TW (Tag Write) micro operation. Similarly, a CLEAR graphics request or an INVD CPU instruction requires issuing a TW micro operation for each cache line. The sequence of micro operations is shown in FIGS. 3A and 3B. At step 150, a TRR micro operation reads out the tag and the data for a cache line. At step 152, if the state of the cache line is modified, then at step 154 that data is written back to main memory 106. Otherwise at step 156, a TW micro operation forces the tag array to store an invalid state to a cache state array for the cache line. At step 158, steps 150 through 156 are repeated until each cache line within the cache memory 110 is processed.

Assuming that each micro operation takes four-CPU clock cycles and that the minimum spacing between micro operations is two-CPU clock cycles, then we need (4+2+4+2)×4=48 clock cycles for a FLUSH operation and (4+2)×4=24 clock cycles for a CLEAR operation. However, in accordance with the teachings of the present invention, we can utilize one shot, or single cycle cache line invalidation to drastically reduce the number of required clock cycles. As depicted in FIG. 3B, since one shot invalidation invalidates the entire cache within a single CPU clock cycle, the TW micro operation of step 156 is no longer required. Consequently, a FLUSH operation now requires just (4+2)×4+1=25 cycles and a CLEAR operation requires just 1 cycle. The performance gains achieved using one shot invalidation is 48% for a FLUSH operation and 96% for a CLEAR operation. Table 1 shows the performance gains achieved for a 256K cache (total of 8192 cache lines with a 32-byte cache line size). A system architecture for implementing the single cycle cache line invalidation is now described.

TABLE 1

Performance gains for one shot invalidation for a 256K cache

| GRAPHICS REQUEST/CPU INSTRUCTION | EXISTING METHOD (UCODE OR FSM) WITHOUT ONE SHOT INVALIDATION | | | | WITH ONE SHOT INVALIDATION | | | |
|---|---|---|---|---|---|---|---|---|
| | FLUSH/WBINVD | | CLEAR/INVD | | FLUSH/WBINVD | | CLEAR/INVD | |
| TRR(TAG & DATA READ MICRO OPERATION) | YES | 4 | NO | 0 | YES | 4 | NO | 0 |
| SPACING BETWEEN MICRO OPERATIONS | YES | 2 | NO | 0 | NO | 0 | NO | 0 |
| TW (TAG/STATUS WRITE MICRO OPERATION) | YES | 4 | YES | 4 | NO | 0 | NO | 0 |
| SPACING BETWEEN MICRO OPERATIONS | YES | 2 | YES | 2 | YES | 2 | NO | 0 |
| CPU CLOCK CYCLES PER LINE | | 12 | | 6 | | 6 | | 0 |
| CPU CLOCK CYCLES FOR ONE SHOT INVALIDATION | | 0 | | 0 | | 1 | | 1 |
| TOTAL CPU CLOCK CYCLES FOR CACHE | | 98304 | | 49152 | | 49153 | | 1 |
| PERFORMANCE GAIN EXPRESSED AS A % | | 0% | | 0% | | −50% | | −100% |

System Architecture

The following System Architecture describes two specific embodiments for implementing single cycle cache line invalidation as taught by the present invention. However, those skilled in the art will appreciate that the teaching of the present invention may be implemented using various circuit design modifications. Specifically, by making a simple modification to a cache state array, coupled with minimal changes to the microcode routines or FSMs, rapid invalidation of the entire cache is possible, thereby reducing the total cache line invalidation time to just one clock cycle. We refer to this novel technique as One Shot or Single Cycle Cache Line Invalidation for the remainder of this specification.

Figure 5A:
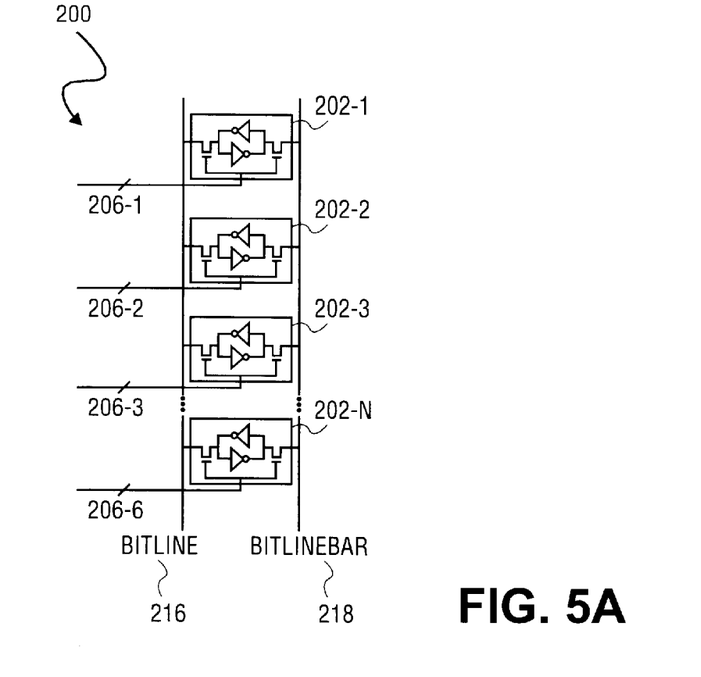
FIG. 5A depicts a conventional cache state array.

FIG. 5A depicts a cache state array 200 for use in a cache memory such as cache memory 110 of the microprocessor system 100 as depicted in FIG. 1. The cache state array 200 includes a plurality of memory cells 202 (202-1, . . . , 202-n) coupled together between two data line electrodes (bit line 216, bit line bar 218). Each memory cell 202 includes a pair of cross coupled inverters 204 (204A, 204B) coupled within the two data line electrodes 216, 218 and a word line 206 by a pair of pass transistors 208 and 210, as further depicted in FIG. 5B. The cache state array 200 may include four different states: an invalid state, a shared state, an exclusive state and a modified state for every cache line within the cache memory 110. The cache state array 200 preferably includes a decoder as depicted in FIG. 6A. The decoder 242 is coupled to each word line 206 (206-1, ..., 206-n) by a select line 244 (244-1, ..., 244-4). The cache state array decoder 242 write/read enables a desired memory cell 202 within the cache state array 200 to store information available on the bit line 216 and the bit line bar 218.

Figure 5B:
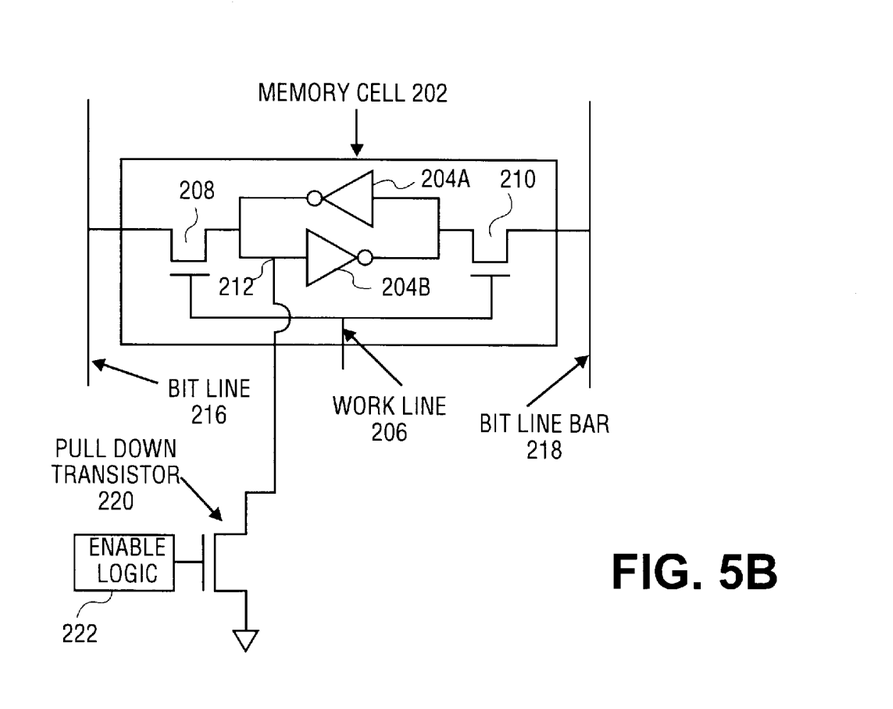
FIG. 5B depicts a memory cell of a cache state array able to support one-shot invalidation according to a first embodiment of the present invention.
Figure 6A:
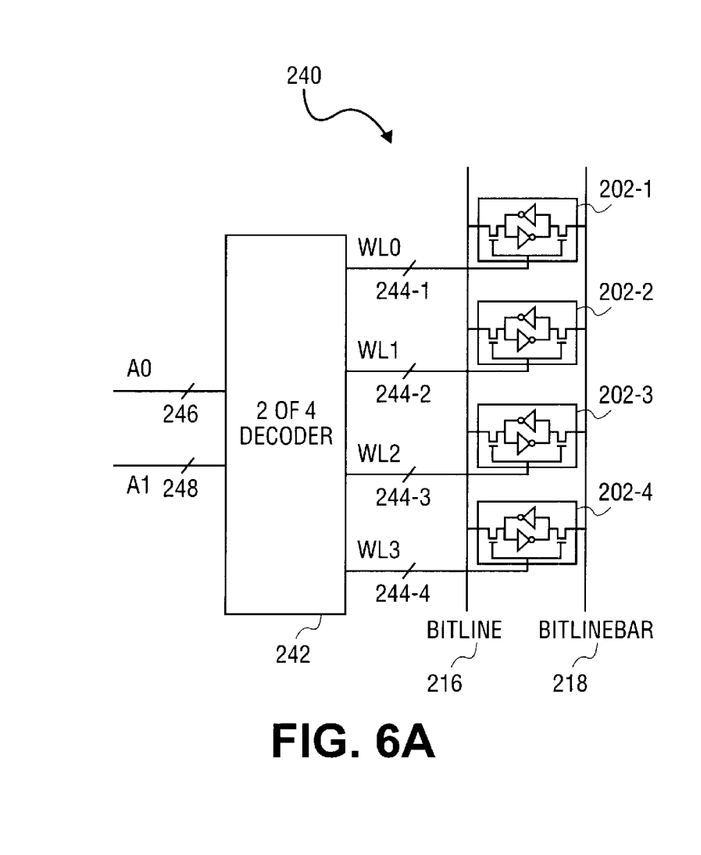
FIG. 6A depicts a conventional cache state array including a decoder.

Referring to FIG. 5B, a means is depicted for enabling single cycle cache line invalidation of each memory cell 202 within the cache state array 200. A pulldown transistor 220 is added to each memory cell 202 within the cache state array 200. The pulldown transistor 220 is coupled to an input 212 of an inverter 204B within the memory cell 202 such that the input 212 to the inverter 204B of each memory cell 202 within the cache state array 200 is pulled down in response to an enable logic signal 222. Based on a feedback mechanism of each pair of cross coupled inverters 204A, 204B, each memory cell 202 within the cache state array 200 retains the pulldown value, thereby invalidating each cache line within the cache state array during a single clock cycle. The memory cell 200 retains this pulldown value even after the enable signal goes inactive. This result is achieved since clearing the state information of each memory cell 200 is synonymous with storing an invalid state, thereby achieving one shot invalidation.

The advantage of this method is that we achieve one shot invalidation of the entire cache state array 200. Though this method entails minimal modifications to the cache state array 200, the circuit design engineer should consider various circuit design implementation issues involved.

Referring to FIG. 6A as described above, a cache state array 240 including a decoder 242, is depicted. As described above, the decoder 242 selects one of the four word lines (WL0–WL3) based on the address inputs A0 246 and the A1 248. The word line 206 then select the memory cell 202 and enables the selected memory cell 202 to store information available on the bit line 216 and the bit line bar 218.

Figure 6B:
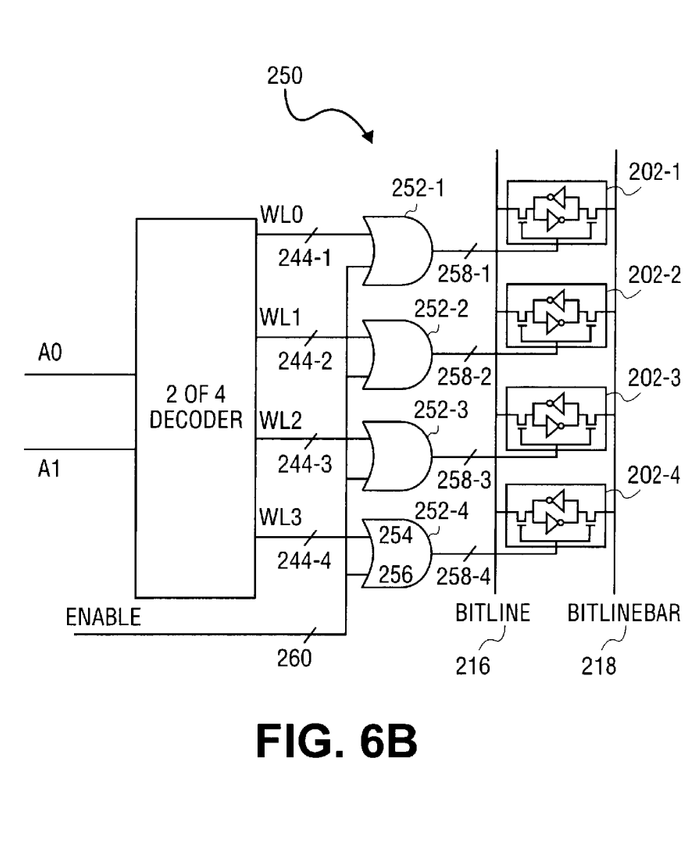
FIG. 6B depicts a cache state array including a decoder array able to support one-shot invalidation according to a further embodiment of the present invention.

Referring to FIG. 6B, a further means is depicted for implementing single cycle cache line invalidation of the cache state array within a single clock cycle. An OR gate 252 (252-1, ..., 252-4) is added to each memory cell 200 within the cache state array 200. Each OR gate 252 includes a first input 254 coupled to an enable signal 260. A second input 256 is coupled to the select line 244 and an output 258 (258-1, ..., 258-4) is coupled to a word line 206 of the memory cell 202. When the enable signal line 260 is active, each word line 206 of each memory cell 202 within the cache state array 200 is selected. As a result, each memory cells 202 within the cache state array 200 is write enabled for storing information available on the bit line 216 and bit line bar 218. Write enabling of each memory cell 202 within the cache state array 200 occurs during a first phase of the clock cycle, and writing an invalid state to each memory cell 202 within the cache state array 200 occurs during the second phase of the clock cycle. Consequently, each cache line within the cache memory is invalidated during a single clock cycle formed by the first phase of the clock cycle and the second phase of the clock cycle.

Figure 8A:
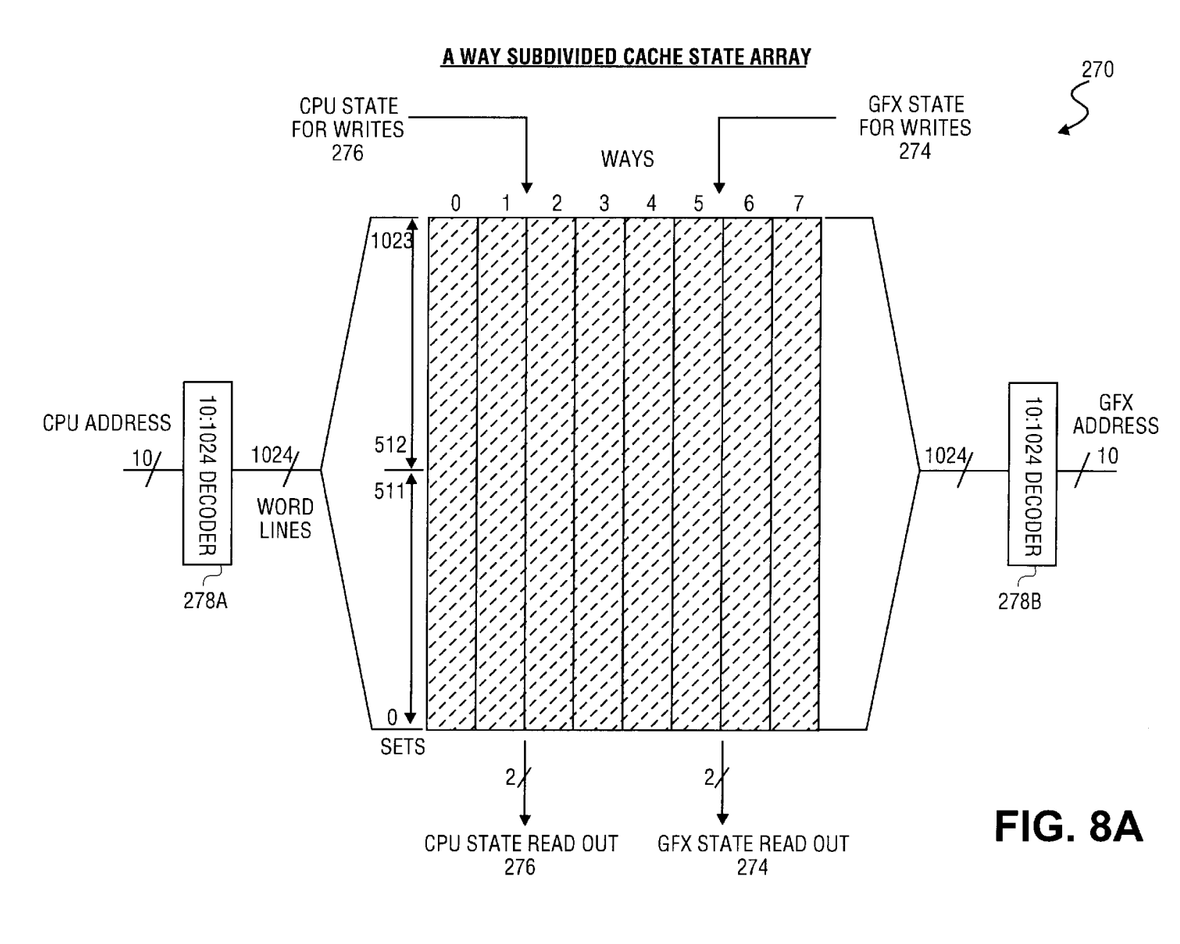
FIGS. 8A–8D depict block diagrams for way-dividing and set-dividing a cache state array in order to achieve partial, single-cycle invalidation according to an exemplary embodiment of the invention.
Figure 8B:
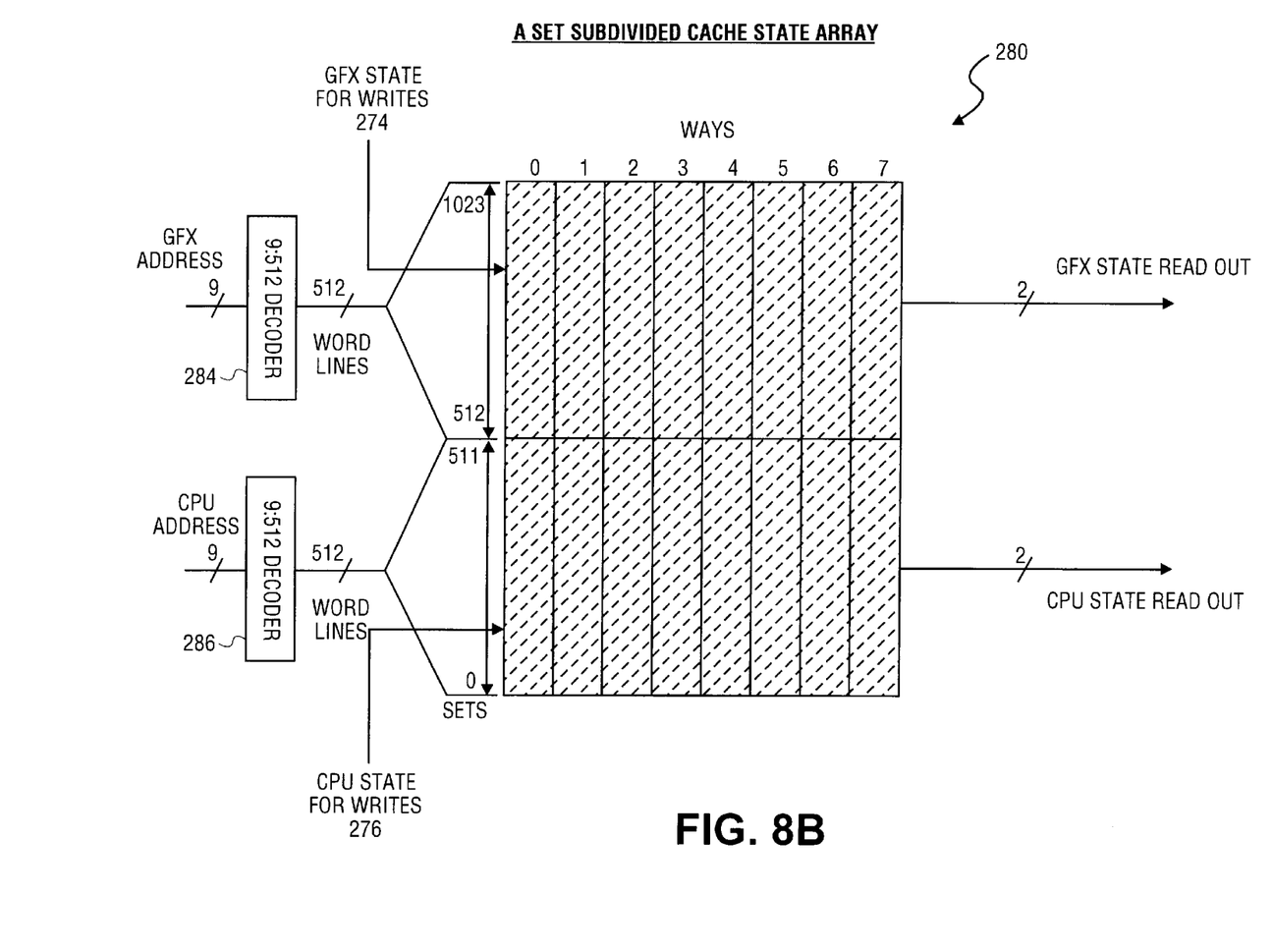

The implementation shown in FIG. 6B is simple, yet more involved than the implementation shown in FIG. 5B. However, the former has advantages over the latter. Decoders are generally designed to be hierarchical, requiring multiple levels to decode all the address inputs to the cache. As depicted in FIGS. 8A and 8B, a decoder design may be way subdivided (FIG. 8A) or set subdivided (FIG. 8B).

Referring to FIG. 8A, a way subdivided cache 270 between graphics requests 274 and CPU requests 276 is depicted. The way subdivided cache state array includes a pair of decoders 278 (278A, 278B) for selecting desired sets within the given ways. Referring to FIG. 8B, a set subdivided cache state array 280 between graphics requests 274 and CPU requests 276 is depicted. The set subdivided cache state array 280 includes a pair of decoders 284 and 286 for selecting desired ways within the given sets. In accordance with the teach of the present invention as depicted in FIG. 6B, a plurality of OR-gates 279 may be added to the way subdivided cache state array 270 to achieve partial invalidation of sets within a give way during a single clock cycle. Likewise, a plurality of OR-gates 288 may be added to the set subdivided cache state array 270 to achieve partial invalidation of ways within a given set during a single clock cycle. Additional details regarding way dividing or set dividing cache state arrays are known to those skilled in the art and are therefore not set forward to avoid obscuring the present invention.

Figure 8C:
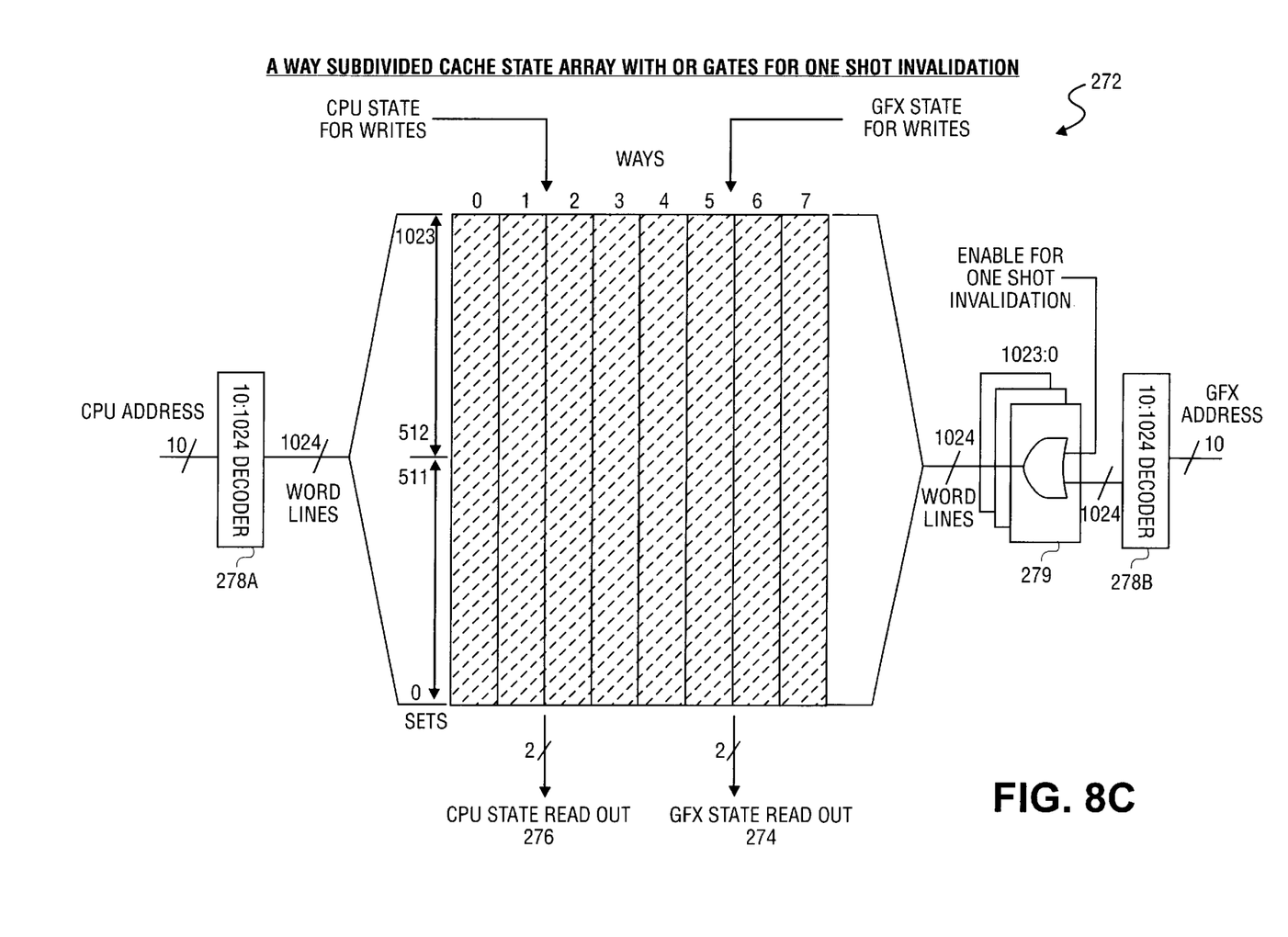
Figure 8D:
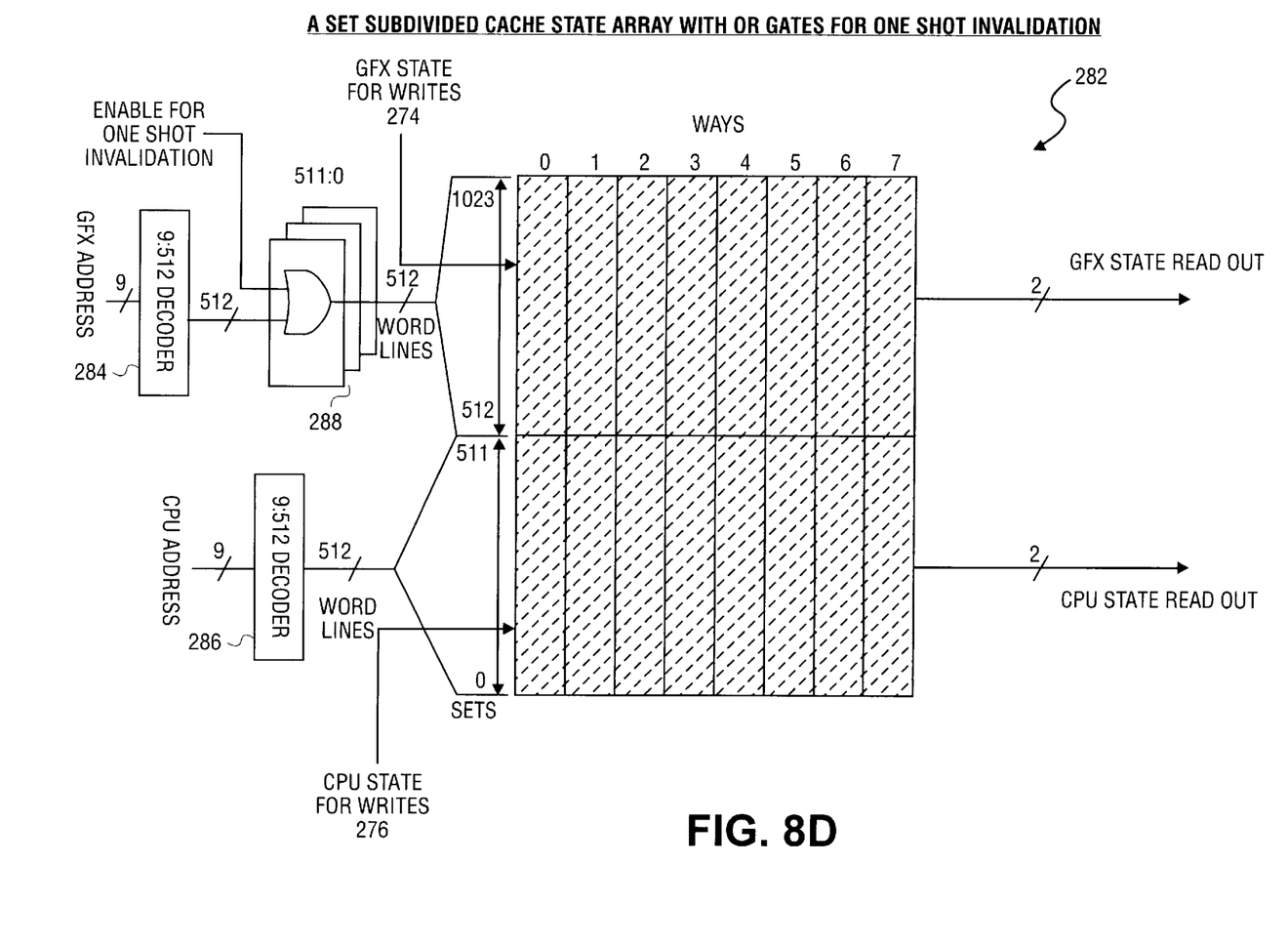

Thus, depending on the decoder design, we could achieve partial or full invalidation of the cache. In other words, we could invalidate all the sets for a given way (FIG. 8C) or all the ways for a given set (FIG. 8D) of the cache in accordance with the single cycle cache line invalidation as taught by the present invention. This is particularly useful in a shared cache in an Integrated Microprocessor, for example as depicted in FIG. 1 where the graphics requests from the graphics queues are designated predefined ways of the cache. A FLUSH or CLEAR request from these queues needs to invalidate all the sets for a given way. If the layout for the cache state array is way sub-divided 270, as depicted in FIG. 8A, then we can easily achieve partial invalidation of the cache 110. The implementation shown in FIG. 5B can also be used to achieve partial invalidation. However, once implemented, it is hard coded and cannot be changed to perform one shot invalidation of the entire cache 110.

Figure 7:
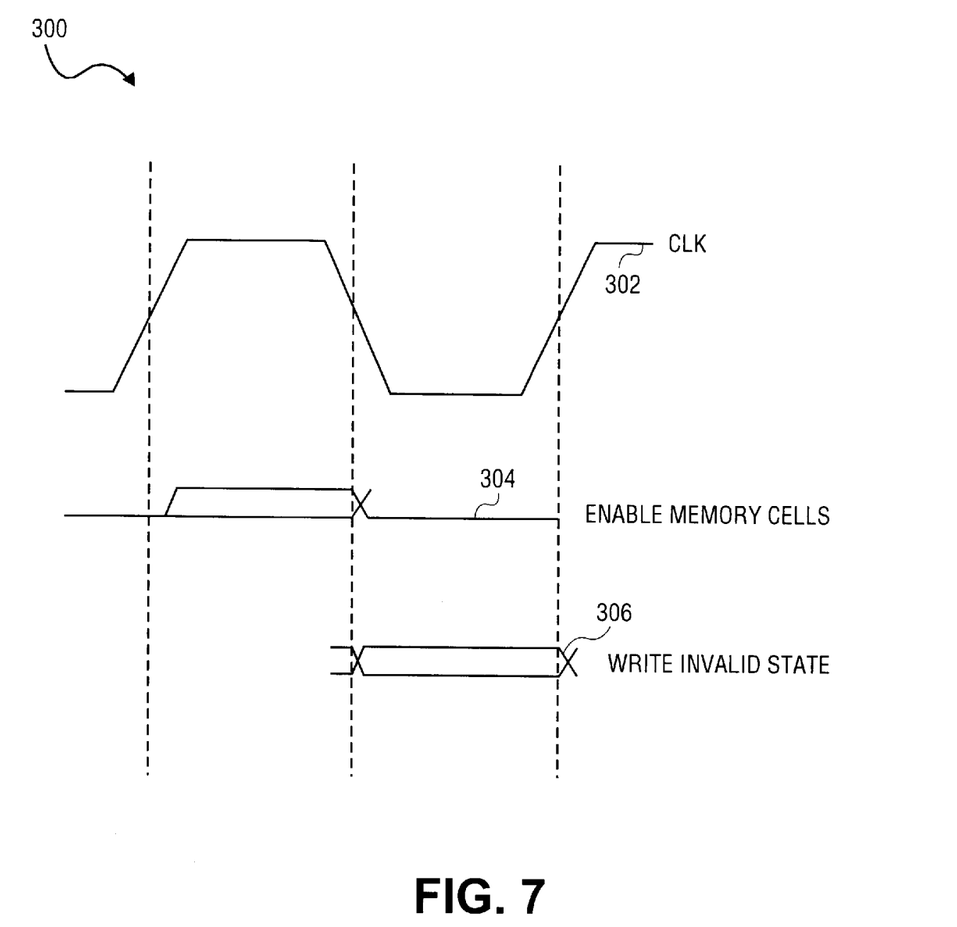
FIG. 7 depicts a timing diagram of various signal wave forms which may be employed in various embodiment of the present invention.

The operation of single cycle, cache line invalidation in a typical embodiment of the present invention is now described with reference to FIGS. 6A and 7. During a first phase of the clock cycle 302, each memory cell 202 within the cache state array 200 is enabled. During the second phase of the clock cycle 302, an invalid state is written to each memory cell 202 within the cache state array 200. Although this embodiment is described with reference to a two out of four (2 of 4) decoder, those skilled in the art will appreciate that the teachings of the present invention can be applied to decoders of various sizes.

In addition, although it is assumed that the entire invalidation process in accordance with this embodiment takes just one clock cycle, in practice however, the invalidation time is dependent on the capacitive loads on the bit lines 216, 218 and the word lines 206. Various timing issues also need to be considered by the circuit design engineer. However, even if the penalty is a few clock cycles within this implementation, the performance gain achieved is within 1% of that represented in Table 1.

In summary, the implementations described above have advantages and limitations with respect to each other. Therefore, the task falls to the design engineer to choose the implementation that is most suitable from the design view point.

The present invention provided many advantages over known techniques. The present invention describes a method and apparatus for implementing One shot or single cycle cache line invalidation that reduces the total time required for invalidation of all cache lines within the cache memory to just a clock cycle. The implementation is simple with minimal changes to the cache array limited only to those cells that store the state information of the cache lines. Since many system operations necessitate invalidation of the entire cache, one shot invalidation clearly improves the system performance with no significant impact on the die size. The one shot invalidation technique described here is applicable to any instructions, methods or engine requiring invalidation of multiple cache lines; and it can be implemented with either of the two schemes described in this document or variations thereof.

Having disclosed exemplary embodiments and the best mode, modifications and variations may be made to the disclosed embodiments while remaining within the scope of the invention as defined by the following claims.

What is claimed is:

1. A method comprising:
   sequentially and individually performing a write back operation for each cache line within a cache memory;
   delaying invalidation of each cache line within the cache memory until completion of all write backs required for the cache memory; and
   performing invalidation of all cache lines within the cache memory within a single cycle which comprising of:
   enabling memory cells within a cache state array of the cache memory; and
   writing an invalid state to each memory cell within the cache state array of the cache memory, wherein the enabling of the memory cells within the cache state array of the cache memory occurs during a first phase of a clock cycle and the writing of the invalid state in each memory cell within the cache state array of the cache memory occurs during a second phase of the clock cycle, such that cache line invalidation of each cache line within the cache memory occurs within a single clock cycle formed by the first phase of the clock cycle and the second phase of the clock cycle.

2. The method of claim 1, wherein the enabling memory cells within a cache state array further comprises:
   modifying decoder logic of the cache state array, such that when an enable signal is active, each word line of each memory cell within the cache state array is selected, thereby write enabling each memory cell within the cache state array during the first phase of the clock cycle.

3. The method of claim 1, wherein the writing an invalid state to each memory cell within the cache state array further comprises:
   placing a low value on a data line electrode joining each memory cell within the cache state, such that an input to an inverter of each memory cell with the cache state array is pulled down wherein a feedback mechanism of each pair of cross-coupled inverters of each memory cell retains the pulled down value thereby invalidating each cache line within the cache state array within a single clock cycle without activating a word line of each memory cell within the cache state array.

4. The method of claim 1, wherein the cache memory is a shared cache memory between CPU requests and graphics requests, the method further comprises:
   context switching from a first mode to a second mode by writing back all modified cache lines within the cache memory to a main memory prior to the enabling of memory cells within the cache state array of the cache memory.

5. The method of claim 1, wherein a decoder of the cache state array is way-divided, such that each set within a given way of the cache memory is invalidated during the single clock cycle.

6. The method of claim 1, wherein a decoder of the cache state array is set-divided, such that each way within a given set of the cache memory is invalidated during the single clock cycle.

7. A cache memory comprising:
   a plurality of memory cells coupled together between two data line electrodes to form the cache state array, each memory cell including a pair of cross-coupled inverters coupled within the two data electrodes and a word line by a pair of pass transistors;
   a cache state array decoder coupled to each word line of each memory cell within the cache state array by a select line, such that the cache state array decoder write/read enables a desired memory cell within the cache state array; and
   a means for invalidating each cache line within the cache memory within a single clock cycle, such that memory cells within the cache state array are enabled during a first phase of the single clock cycle and an invalid state is written to the memory cells within the cache state array during a second phase of the single clock cycle.

8. The cache memory of claim 7, wherein the means for invalidating each cache line within the cache memory within the single clock cycle comprises:
   a pull down transistor for each memory cell within the cache state array, the pull down transistor coupled to an input of an inverter within the memory cell, such that the input to the inverter of each memory cell with the cache state array is pulled down in response to an enable signal, wherein a feedback mechanism of each pair of cross-couple inverters of each memory cell retains the pulled down value thereby invalidating each cache line within the cache state array within a single clock cycle without activating a word line of each memory cell within the cache state array.

9. The cache memory of claim 7, wherein the means for invalidating each cache line within the cache memory within the single clock cycle comprises:
   an OR-gate for each memory cell within the cache state array, the OR-gate having a first input coupled to an enable single line, a second input coupled to an array select line and an output coupled to a word line of the memory cell, such that when the enable signal line is active, each word line of each memory cell within the cache state array is selected, thereby write enabling each memory cell within the cache state array during the first phase of the clock cycle and writing an invalid state to each memory cell within the cache state array during the second phase of the clock cycle thereby invalidating each cache line within the cache memory within the single clock cycle.

10. The cache memory of claim 7, wherein the cache memory is a shared cache memory between CPU requests and graphics engine requests.

11. The cache memory of claim 7, wherein the decoder of the cache state array is way-divided, such that each set within a given way of the cache memory is invalidated during the single clock cycle.

12. The cache memory of claim 7, wherein the decoder of the cache state array is set-divided, such that each way within a given set of the cache memory is invalidated during the single clock cycle.

13. A cache memory comprising:
- a plurality of memory cells coupled together between two data line electrodes to form the cache state array, each memory cell including a pair of cross-coupled inverters coupled within the two data electrodes and a word line by a pair of pass transistors;
- a cache state array decoder coupled to each word line of each memory cell within the cache state array by a select line, such that the cache state array decoder write/read enables a desired memory cell within the cache state array; and
- a pull down transistor for each memory cell within the cache state array, the pull down transistor coupled to an input of an inverter within the memory cell, such that the input to the inverter of each memory cell with the cache state array is pulled down in response to an enable signal, wherein a feedback mechanism of each pair of cross-couple inverters of each memory cell retains the pulled down value thereby invalidating each cache line within the cache state array within a single clock cycle without activating a word line of each memory cell within the cache state array.

14. The cache memory of claim 13, wherein the cache memory is a shared cache memory between CPU requests and graphics engine requests.

15. The cache memory of claim 13, wherein the cache memory is a shared cache memory between CPU requests and graphics requests, such that the cache memory context switches from a first mode to a second mode by writing back all modified cache lines within the cache memory to a main memory prior to invalidating the memory cells within the cache state array.

16. A cache memory comprising:
- a plurality of memory cells coupled together between two data line electrodes to form the cache state array, each memory cell including a pair of cross-coupled inverters coupled within the two data electrodes and a word line by a pair of pass transistors;
- a cache state array decoder coupled to each word line of each memory cell within the cache state array by a select line, such that the cache state array decoder write/read enables a desired memory cell within the cache state array; and
- an OR-gate for each memory cell within the cache state array, the OR-gate having a first input coupled to an enable single line, a second input coupled to an array select line and an output coupled to a word line of the memory cell, such that when the enable signal line is active, each word line of each memory cell within the cache state array is selected, thereby write enabling each memory cell within the cache state array during the first phase of the clock cycle and writing an invalid state to each memory cell within the cache state array during the second phase of the clock cycle thereby invalidating each cache line within the cache memory within the single clock cycle.

17. The cache memory of claim 16, wherein the decoder of the cache state array is way-divided, such that each set within a given way of the cache memory is invalidated during the single clock cycle.

18. The cache memory of claim 16, wherein the decoder of the cache state array is set-divided, such that each way within a given set of the cache memory is invalidated during the single clock cycle.

19. An integrated microprocessor system comprising:
- a bus;
- a CPU coupled to the bus;
- a graphics engine coupled to the bus
- a first memory coupled to the bus including a memory controller; and
- a single clock cycle invalidation cache memory coupled to the bus the CPU and the graphic engine, the cache memory comprising:
  - a plurality of memory cell coupled together between two data line electrodes to form a cache state array, each memory cell including a pair of cross coupled inverters coupled within the two data electrodes and a word line by a pair of pass transistors;
  - a cache state array decoder coupled to each word line of each memory cell within the cache state array by a select line, such that the cache state array decoder write/read enables a desired memory cell within the cache state array; and
  - a means for invalidating each cache line within the cache memory within a single clock cycle, such that memory cells within the cache state array are enabled during a first phase of the single clock cycle and an invalid state is written to the memory cells within the cache state array during a second phase of the single clock cycle.

20. The cache memory of claim 19, wherein the means for invalidating each cache line within the cache memory within the single clock cycle comprises:
- a pull down transistor for each memory cell within the cache state array, the pull down transistor coupled to an input of an inverter within the memory cell, such that the input to the inverter of each memory cell with the cache state array is pulled down in response to an enable signal, wherein a feedback mechanism of each pair of cross-couple inverters of each memory cell retains the pulled down value thereby invalidating each cache line within the cache state array within a single clock cycle without activating a word line of each memory cell within the cache state array.

21. The integrated microprocessor system of claim 19, wherein the means for invalidating each cache line within the cache memory within the single clock cycle comprises:
- an OR-gate for each memory cell within the cache state array, the OR-gate having a first input coupled to an enable single line, a second input coupled to an array select line and an output coupled to a word line of the memory cell, such that when the enable signal line is active, each word line of each memory cell within the cache state array is selected, thereby write enabling each memory cell within the cache state array during the first phase of the clock cycle and writing an invalid state to each memory cell within the cache state array during the second phase of the clock cycle thereby invalidating each cache line within the cache memory within the single clock cycle.

22. The integrated microprocessor system of claim 21, wherein the decoder of the cache state array is way-divided, such that each set within a given way of the cache memory is invalidated during a single clock cycle.

23. The integrated microprocessor system of claim 21, wherein the decoder of the cache state array is set-divided, such that each way within a given set of the cache memory is invalidated during a single clock cycle.

24. An integrated microprocessor system comprising:
- a bus;
- a CPU coupled to the bus;
- a graphics engine coupled to the bus a first memory coupled to the bus including a memory controller; and a single clock cycle invalidation cache memory coupled to the bus the CPU and the graphic engine, the cache memory comprising:
  a plurality of memory cell coupled together between two data line electrodes to form a cache state array, each memory cell including a pair of cross coupled inverters coupled within the two data electrodes and a word line by a pair of pass transistors;
  a cache state array decoder coupled to each word line of each memory cell within the cache state array by a select line, such that the cache state array decoder write/read enables a desired memory cell within the cache state array; and
  an OR-gate for each memory cell within the cache state array, the OR-gate having a first input coupled to an enable single line, a second input coupled to an array select line and an output coupled to a word line of the memory cell, such that when the enable signal line is active, each word line of each memory cell within the cache state array is selected, thereby write enabling each memory cell within the cache state array during the first phase of the clock cycle and writing an invalid state to each memory cell within the cache state array during the second phase of the clock cycle thereby invalidating each cache line within the-cache memory within the single clock cycle.

25. The integrated microprocessor system of claim 24, wherein the decoder of the cache state array is way-divided, such that each set within a given way of the cache memory is invalidated during a single clock cycle.

26. The integrated microprocessor system of claim 24, wherein the decoder of the cache state array is set-divided, such that each way within a given set of the cache memory is invalidated during a single clock cycle.

27. An integrated microprocessor system comprising:
  a bus;
  a CPU coupled to the bus;
  a graphics engine coupled to the bus
  a first memory coupled to the bus including a memory controller; and
  a single clock cycle invalidation cache memory coupled to the bus the CPU and the graphic engine, the cache memory comprising:
    a plurality of memory cell coupled together between two data line electrodes to form a cache state array, each memory cell including a pair of cross coupled inverters coupled within the two data electrodes and a word line by a pair of pass transistors;
    a cache state array decoder coupled to each word line of each memory cell within the cache state array by a select line, such that the cache state array decoder write/read enables a desired memory cell within the cache state array; and
    a pull down transistor for each memory cell within the cache state array, the pull down transistor coupled to an input of an inverter within the memory cell, such that the input to the inverter of each memory cell with the cache state array is pulled down in response to an enable signal, wherein a feedback mechanism of each pair of cross-couple inverters of each memory cell retains the pulled down value thereby invalidating each cache line within the cache state array within a single clock cycle without activating a word line of each memory cell within the cache state array.

28. The integrated microprocessor system of claim 27, wherein the CPU, the graphic engine, the main memory, the main memory controller and the cache memory are dispose together on a single semiconductor substrate and the main memory comprises DRAM.

29. The cache memory of claim 27, wherein the cache memory is a shared cache memory between CPU requests and graphics engine requests.

* * * * *